(12) United States Patent
Somaraju

(10) Patent No.: US 10,736,197 B2
(45) Date of Patent: Aug. 4, 2020

(54) LIGHTING STATE SYNCHRONIZATION

(71) Applicant: TRIDONIC GMBH & CO KG, Dornbirn (AT)

(72) Inventor: Abhinav Somaraju, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 131 days.

(21) Appl. No.: 15/748,687

(22) PCT Filed: Aug. 23, 2016

(86) PCT No.: PCT/AT2016/060038
§ 371 (c)(1),
(2) Date: Jan. 30, 2018

(87) PCT Pub. No.: WO2017/054021
PCT Pub. Date: Apr. 6, 2017

(65) Prior Publication Data
US 2019/0008021 A1     Jan. 3, 2019

(30) Foreign Application Priority Data
Sep. 30, 2015 (GB) .................... 1517251.3

(51) Int. Cl.
*H05B 37/02* (2006.01)
*H05B 47/175* (2020.01)
*H04B 1/38* (2015.01)

(52) U.S. Cl.
CPC ............. *H05B 47/175* (2020.01); *H04B 1/38* (2013.01)

(58) Field of Classification Search
CPC ............ H05B 37/0227; H05B 37/0245; H05B 37/0272; H05B 37/0281
USPC ......................................... 315/152, 307, 312
See application file for complete search history.

(56) References Cited

U.S. PATENT DOCUMENTS

| | | | |
|---|---|---|---|
| 5,898,384 A | 4/1999 | Alt et al. | |
| 6,035,266 A | 3/2000 | Williams et al. | |
| 9,713,235 B2* | 7/2017 | Brochu | H05B 33/08 |
| 2002/0080027 A1 | 6/2002 | Conley | |
| 2004/0100396 A1 | 5/2004 | Antico et al. | |
| 2005/0054292 A1 | 3/2005 | Janusz et al. | |

(Continued)

FOREIGN PATENT DOCUMENTS

| WO | 0181166 | 11/2001 |
|---|---|---|
| WO | 0195646 | 12/2001 |
| WO | 2014009880 | 1/2014 |

OTHER PUBLICATIONS

Search report in priority GB Application GB1517251.3 dated Mar. 27, 2016.

(Continued)

*Primary Examiner* — Tung X Le
(74) *Attorney, Agent, or Firm* — Andrus Intellectual Property Law

(57) ABSTRACT

Communication (351) on a communication link is monitored. At a predetermined point in time (380), packetized data (350) indicating a luminaire status information of a luminaire is sent. Said sending of the packetized data (350) is selectively executed depending on said monitoring. In various embodiments, said sending of the packetized data (350) and said monitoring of the communication on the communication link may comprise executing a Trickle algorithm.

12 Claims, 3 Drawing Sheets

(56) References Cited

U.S. PATENT DOCUMENTS

| | | | | |
|---|---|---|---|---|
| 2006/0039698 A1* | 2/2006 | Pautler | ................... | H04B 10/00 |
| | | | | 398/33 |
| 2006/0125426 A1* | 6/2006 | Veskovic | ............... | H05B 47/18 |
| | | | | 315/312 |
| 2012/0040606 A1* | 2/2012 | Verfuerth | ........... | H05B 37/0218 |
| | | | | 455/7 |
| 2012/0217880 A1* | 8/2012 | Nieuwlands | ....... | H05B 33/0854 |
| | | | | 315/153 |
| 2013/0293112 A1* | 11/2013 | Reed | ...................... | H05B 45/20 |
| | | | | 315/131 |
| 2015/0264781 A1 | 9/2015 | Juslen et al. | | |
| 2016/0381763 A1* | 12/2016 | Loeb | ..................... | H05B 47/19 |
| | | | | 315/297 |

OTHER PUBLICATIONS

PCT International Search Report in parent PCT Application PCT/AT2016/060038 dated Nov. 16, 2016.

Levis, et al.; Internet Engineering Task Force (IETF) Request for Comments: 6206, Mar. 2011.

\* cited by examiner

LIGHTING STATE SYNCHRONIZATION

CROSS REFERENCE TO RELATED APPLICATIONS

The present application is the U.S. national stage application of International Application PCT/AT2016/060038, filed Aug. 23, 2016, which international application was published on Apr. 6, 2017 as International Publication WO 2017/054021 A1. The International Application claims priority to Great Britain Patent Application 1517251.3, filed Sep. 30, 2015.

TECHNICAL FIELD OF THE INVENTION

Various embodiments relate to a controller and a method. In particular, various embodiments relate to sending packetized data indicating a luminaire status information of a luminaire, wherein said sending of the packetized data is selectively executed depending on monitoring communication on a communication link.

BACKGROUND OF THE INVENTION

In networks comprising a plurality of luminaire nodes, it may be desirable to adjust lighting states of the plurality of luminaire nodes to correspond to each other (synchronization). Several techniques have been proposed to achieve synchronization of the lighting states of the plurality of luminaire nodes. Such techniques can be typically categorized into centralized architectures and distributed architectures.

In centralized architectures, a central master server typically maintains the state of all luminaires, e.g., by either directly controlling the lighting states of the luminaires or by periodically querying the lighting states of the luminaires.

In distributed architectures, the luminaires typically communicate with each other and indicate their lighting states by means of luminaire status information. The luminaire status information is then used to decide, e.g., on a majority lighting state of the luminaires to obtain synchronization.

Such techniques as mentioned above face certain restrictions and drawbacks.

E.g., for centralized architectures, there is typically a single point of failure in form of the master server—which increases the risk of downtime and failure of synchronization. Further, it is required to provide the master server which typically is a complex device and requires comparably high computational resources. This often increases costs and maintenance requirements.

On the other hand, in distributed architectures, it is often difficult to achieve synchronization with low latency: this is because the luminaire status information typically needs to be exchanged between multiple luminaire nodes. However, exchanging a large number of luminaire status information typically puts high requirements on the bandwidth of the system; while, on the other hand, limiting the amount of luminaire status information exchanged over a period of time increases the latency and makes the system response comparably slow. This typically results in a trade-off situation between low-latency synchronization and high-bandwidth usage. A further drawback and limitation of the distributed architecture is that for a scenario where there is a comparably large number of luminaire nodes, it becomes difficult to achieve synchronization for all luminaire nodes: This is because as the luminaire node density increases, the number of messages that need to be exchanged between the luminaire nodes typically increases quadratically. Thus, scenarios are conceivable where the latency of the system is larger than a typical time span during which luminaire status information remains static.

SUMMARY OF THE INVENTION

Therefore, a need exists for advanced techniques of synchronizing the lighting state of a plurality of luminaires. In particular, a need exists for techniques which alleviate and overcome at least some of the above-mentioned drawbacks and limitations.

This need is met by the features of the invention.

According to an aspect, a controller is provided. The controller comprises a transceiver and at least one processor. The transceiver is configured to communicate on a communication link. The at least one processor is configured to monitor, via the transceiver, communication on the communication link. The at least one processor is further configured to send, at a predetermined point in time via the transceiver in shared resources of the communication link, packetized data. The packetized data indicates a luminaire status information of the luminaire. The at least one processor is configured to selectively execute said sending of the packetized data depending on said monitoring.

E.g., the controller may be part of the lamp which comprises the controller and the luminaire. E.g., the lamp may comprise a housing which houses, both, the controller and the luminaire. E.g., the luminaire may be a light-emitting diode (LED) and/or an electric discharge lamp.

E.g., the transceiver can be a wireless transceiver or a fixed-line transceiver. Likewise, the communication link can be a fixed-line link or a radio link. Often, bandwidth restrictions may be more severe for a radio link.

An example of a fixed-line link is power-line communication; in such a scenario, the transceiver may be part of a mains interface. A supply voltage of the power line may be modulated.

An example of the radio link is communication via Institute of Electrical and Electronics Engineers (IEEE) 802.11X Wireless Local Area network (WLAN), Bluetooth, Near Field Communication (NFC), Third Generation Partnership Project (3GPP) Machine Type Communication or other radio access technology, or other proprietary protocols, e.g., in the sub-Gigahertz spectrum.

In general, it is possible that the communication link is lossy, i.e., that there is a chance of packetized data being lost or corrupted when communicating via the communication link. Because of this, it may be possible that the at least one processor is configured to sequentially send the packetized data at a plurality of predetermined points in time via the transceiver. Thus, even if a message is lost, a new message may be sent afterwards indicating up-to-date luminaire status information.

E.g., the communication link may be a bi-directional link between the luminaire node implemented by the controller and the luminaire, and the remote luminaires of further luminaire nodes, all forming the network. Thereby, by communicating on the communication link, synchronization of the lighting states of the luminaire nodes of the network may be achieved.

E.g., the transceiver can be configured to implement unicast or multicast/broadcast transmission. E.g., the communication link may be implemented as power line communication where a supply voltage is modulated to encode logical ONEs and ZEROs. E.g. encoding may be achieved by phase gating and/or phase chopping of at least one half cycle of the supply voltage. E.g., the communication link may be part of a bus system. E.g., a bus system such as DALI or DSI or a power-line modulated bus system. For multicast transmission, all further luminaire nodes of the network may be able to receive and decode the packetized data. This simplifies synchronization as the number of messages conveyed by the packetized data may be reduced.

Said monitoring, via the transceiver, of the communication of the communication link can correspond to: listening for communication on the communication link; and/or receiving packetized data communicated by further luminaire nodes of the network on the communication link; and/or inspecting the received packetized data for further luminaire status information included in the received packetized data; and/or analyzing the further luminaire status information, e.g., by comparison with the local luminaire status information.

The shared resources may correspond to a set of time-frequency blocks that can be accessed by all luminaire nodes of the network, e.g., without the need of a specific dedicated grant prospectively received and/or requested. In that respect, due to the shared character of the resources, collision between multiple luminaire nodes of the network trying to communicate on the communication link in the same time-frequency block can occur. In some scenarios, it may be possible that the control is configured to implement, via the transceiver, a collision avoidance mechanism. E.g., the collision avoidance mechanism may comprise a random backoff time. E.g., the collision avoidance mechanism may comprise a Carrier Sense Multiple Access/Collision Detection (CSMA/CD)-type technique. E.g., the collision avoidance mechanism may include a Trickle algorithm.

A likelihood of collisions may be further reduced by selectively executing said sending depending on said monitoring. Selectively executing said sending can correspond to: executing said sending or not executing said sending depending on said monitoring. E.g., depending on what communication has been ongoing on the communication link, the at least one processor may be configured to determine whether executing said sending is actually required or unnecessary. Executing said sending may be unnecessary in situations where sending the luminaire status information would result on redundant information being communicated on the communication link, e.g., because the lighting states are already synchronized across the network. Thereby, by executing said sending, e.g., only in situations where the luminaire nodes of the network may actually benefit from the luminaire status information, a traffic load on the communication link is lowered and, thus, a likelihood of collisions in the shared resources is reduced.

The luminaire status information may indicate a current lighting state of the luminaire. The lighting state of the luminaire may correspond to one or more operating parameter of the luminaire. E.g., the luminaire status information may be selected from the group comprising: brightness; color; dimmer; on/off-status; battery charge level. By including such information on the state of the luminaire in the luminaire status information, a synchronization of various operating parameters of the luminaire nodes of the network can be achieved.

The controller can further comprise a lighting control interface, wherein the at least one processor is configured to receive, via the lighting control interface from the luminaire, the luminaire status information. E.g., the processor can be configured to receive, via the lighting control interface from the luminaire, the luminaire status information at fixed sampling intervals or a predetermined point in time. E.g., the processor can be configured to monitor, via the lighting control interface, changes in the luminaire status information. E.g., the at least one processor can be configured to receive, via the lighting control interface from the luminaire, the luminaire status information before executing said sending of the packetized data, e.g., shortly before the predetermined point in time. Thereby, it can be ensured that the luminaire status information is up-to-date and that—when executing said sending of the luminaire status information—up-to-date information is shared with the further luminaire nodes of the network.

The at least one processor may be configured to receive, via the transceiver as part of said monitoring of the communication on the communication link, further packetized data. The further packetized data may indicate luminaire status information of at least one remote luminaire. The at least one processor may be configured to selectively execute said sending of the packetized data if the luminaire status information of the luminaire is out-of-sync with the luminaire status information of the at least one remote luminaire.

Out-of-sync luminaire status information may correspond to inconsistent lighting states indicated by the luminaire status information of the (local) luminaire and indicated by the luminaire status information of the at least one remote luminaire. E.g., out-of-sync luminaire status information may correspond to a scenario where the brightness and/or color of the luminaire and the at least one remote luminaire differ. Here, an absolute comparison between the values of the various lighting states may be taken into account where, e.g., even small deviations relate to the luminaire status information being out-of-sync. In other scenarios, it would be possible to specify certain ranges of deviations that are tolerable while still assuming that the corresponding luminaire status information is in-sync and not out-of-sync.

By using a comparison between the luminaire status information of the luminaire and the luminaire status information of the at least one remote luminaire when deciding whether to execute or to not execute said sending of the packetized data indicating the luminaire status information of the luminaire, sending of redundant data which is not contributing to achieving a synchronization between the various luminaire nodes of the network can be avoided. A traffic load on the communication link can be reduced.

Above, a scenario has been illustrated where judging whether the luminaire status information of the luminaire is out-of-sync with the luminaire status information of the at least one remote luminaire depends on the respective lighting states indicated by the local and remote luminaire status information. Alternatively or additionally to such a decision criterion, one or more further decision criteria can be taken into account when determining whether the luminaire status information of the luminaire is out-of-sync with the luminaire status information of the at least one remote luminaire. E.g., one further the decision criterion of importance can be a frequency of occurrence of out-of-sync and/or in-sync luminaire status information of the at least one remote luminaire indicated by received further packetized data communicated on the communication link.

E.g., in this respect, the at least one processor may be configured to determine if the luminaire status information of the luminaire is out-of-sync with the luminaire status information of the at least one remote luminaire depending on a threshold comparison between a counter and a predefined threshold. The at least one processor may be configured to adjust a counter depending on a comparison between the luminaire status information of the luminaire and each one of the luminaire status information of the at least one remote luminaire.

E.g., every time further packetized data indicating luminaire status information of a given one of the at least one remote luminaire is received, the comparison may be executed and the counter may be adjusted correspondingly. E.g., the counter may be incremented or decremented if the respective luminaire status information of the given one of the at least one remote luminaire is in-sync or out-of-sync with the luminaire status information of the luminaire.

Using the comparison between the luminaire status information of the luminaire and each one of the luminaire status information of the at least one remote luminaire when deciding whether to execute or not execute said sending of the packetized data indicating the luminaire status information of the luminaire allows that the respective techniques may be flexibly implemented in networks comprising widely varying numbers of luminaire nodes; in particular, respective techniques may be readily applied to networks comprising a comparably large number of luminaire nodes, e.g., more than 20, more than 50, more than 100, or even more than 500 luminaire nodes.

E.g., in various scenarios it is possible that the predefined threshold is determined depending on a number of luminaire nodes of the network. In such situations, by avoiding to send redundant data on the communication link, traffic load on the communication link does not linearly scale with the number of luminaire nodes in the network; thereby, one and the same amount of the shared resources can be sufficient to handle communication allowing for synchronization between a comparably large number of luminaire nodes.

In some scenarios, the at least one processor may be configured to determine the point in time by random selection from within a predetermined time interval. Thereby, a likelihood of collisions of multiple luminaire nodes of the network sending in the shared resources at the same time-frequency element may be reduced.

The at least one processor may be configured to determine the time interval depending on said monitoring of the communication on the communication link. E.g., larger or smaller time intervals may be determined depending on whether the luminaire status information of the luminaire is out-of-sync or in-sync with the luminaire status information of the at least one remote luminaire. E.g., if the luminaire status information of the luminaire is in-sync with the luminaire status information of the at least one remote luminaire, it may be possible to determine the time interval to correspond to longer times.

Thereby, a frequency of occurrence of said sending of the packetized data indicating the luminaire status information may be lower; thereby, a traffic load on the communication link may be reduced in a scenario where synchronization between the luminaire nodes of the network is already achieved. Likewise, where the synchronization between the various luminaire nodes of the network is not achieved, a frequency of occurrence of said sending of the packetized data indicating the luminaire status information of the luminaire may be increased; thereby, a latency in achieving synchronization can be reduced.

E.g., the at least one processor may be configured to execute a Trickle algorithm to implement said monitoring of the communication on the communication link in said sending of the packetized data at the predetermined point in time. By implementing the monitoring of the communication on the communication link and said sending of the packetized data based on a Trickle algorithm, various advantages as explained above can be achieved.

The Trickle algorithm is described in Internet Engineering Task Force (IETF) Request for Comments: 6206, March 2011.

According to a further aspect, a method is provided. The method comprises monitoring communication on a communication link. The method further comprises sending, at a predetermined point in time on a communication link, packetized data. The packetized data indicates a luminaire status information of the luminaire. Said sending of the packetized data is selectively executed depending on said monitoring.

E.g., the method according to the present aspect may be executed by the controller according to a further aspect of the present application.

By the method according to the present aspect, effects may be achieved that are comparable to the effects that may be achieved by the controller according to a further aspect of the present application.

According to a further aspect, a computer program product is provided. The computer program product comprises control instructions that can be executed by a processor. The control instructions, when executed by the processor, cause the processor to execute a method comprising: monitoring communication on a communication link. The method further comprises sending, at a predetermined point in time on a communication link, packetized data. The packetized data indicates a luminaire status information of the luminaire. Said sending of the packetized data is selectively executed depending on said monitoring It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
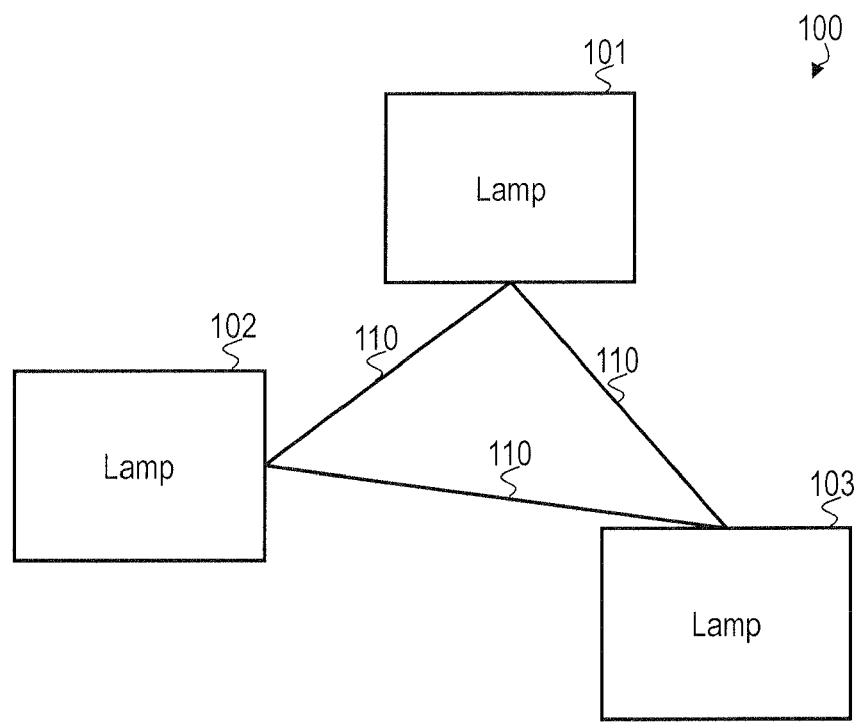
FIG. 1 is a schematic illustration of a network of luminaire nodes connected via a communication link.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of achieving synchronization of lighting states by communicating luminaire status information between luminaire nodes of a network are described. In particular, the techniques described herein allow to employ shared resources on a communication link between the luminaire nodes. Even though shared resources are employed, the techniques described herein allow to reduce a likelihood of collisions on the shared resources while maintaining a comparably low latency for achieving the synchronization of the lighting states. The techniques described herein are highly scalable and may be applied to networks having a comparably large number of luminaire nodes.

The techniques described herein can be, in principle, applied to various kinds and types of communication links. The techniques described herein may be of particular benefit where the communication link offers only a limited amount of shared resources, e.g., due to limited bandwidth, and is lossy. Because of this, for illustrative purposes, hereinafter, reference will be made primarily to the communication link corresponding to a wireless radio link; albeit, in principle, the respective techniques may be readily applied to a fixed-line link.

In FIG. 1, a network 100 comprising three luminaire nodes 101-103 is illustrated. The luminaire nodes 101-103 correspond to lamps as they integrate a luminaire and additional control functionality. The luminaire nodes 101-103 are connected via a radio link 110. Packetized data is communicated on the radio link 110 in shared resources; all luminaire nodes 101-103 may access the shared resources for sending the packetized data Hereinafter, techniques are illustrated which allow to reduce a likelihood of collisions of multiple ones of the luminaire nodes 101-103 attempting to send the packetized data at the same time-frequency elements of the shared resources—even in scenarios where there is a large number of luminaire nodes 101-103 connected to the network 100.

Figure 2:
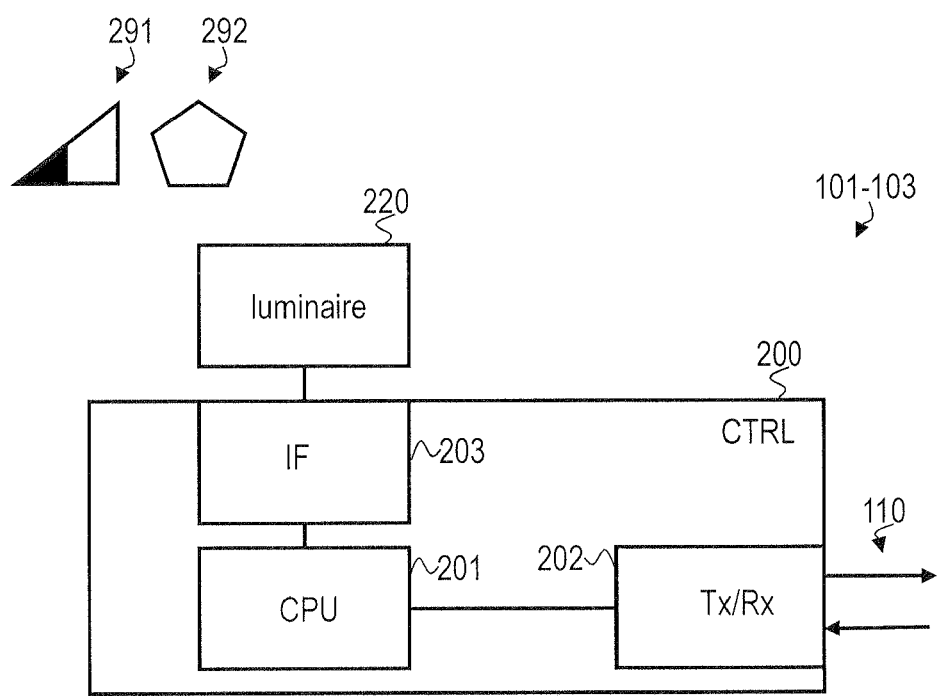
FIG. 2 is a schematic illustration of a controller of a given one of the luminaire nodes of the network of FIG. 1, wherein the controller is configured to execute techniques to achieve synchronization of lighting states between the various luminaire nodes.

Turning to FIG. 2, the luminaire nodes 101-103 are illustrated in further detail. The luminaire nodes 101-103 comprise a luminaire 220, e.g., a LED or an electric discharge lamp. The luminaires 101-103 further comprise a controller 200. The controller 200 comprises electrical circuitry including a processor 201, e.g., a multi-core processor or the like.

The processor 201 is configured to execute control instructions which may be stored in a non-volatile memory (not shown in FIG. 2 for simplicity). Executing the control instructions may cause the processor to execute techniques as described herein with respect to, e.g., sending packetized data indicating luminaire status information and/or controlling and monitoring the lighting state of the luminaire 220.

In this regard, the processor 201 is configured to communicate with the luminaire 220 via a lighting control interface 203. E.g., via the lighting control interface, the processor 201 is configured to set the lighting state of the luminaire 220, e.g., by setting such properties as the brightness 291 and/or the color 292 of the luminaire 220. Further, the at least one processor 201 is configured to receive, via the lighting control interface 203 from the luminaire 220, luminaire status information. The luminaire status information indicates the current lighting state of the luminaire 220. E.g., the luminaire status information indicates elements such as: a brightness 291 of the local luminaire 220; a color 292 of the local luminaire 220; a dimmer level of the local luminaire 220; an on/off-status of the local luminaire 220; and/or a battery charge level of the local luminaire 220.

A wireless transceiver 202 is configured to send packetized data on the radio link 110 in the shared resources; further, the wireless transceiver 202 is configured to receive packetized data in the shared resources on the radio link 110. The packetized data is communicated on the radio link 110 and is employed by the luminaire nodes 101-103 to exchange the luminaire status information to achieve synchronization of lighting states.

Based on the luminaire status information, synchronization between the lighting states of the various luminaires may be achieved. For sending the luminaire status information of the local luminaire, the processor 201 is coupled with a wireless transceiver 202. The processor 201 is configured to send the packetized data indicating the luminaire status information of the local luminaire 220; further, the processor 201 is configured to receive, via the wireless transceiver 202 as part of monitoring communication on the communication link 110, further packetized data indicating luminaire status information of at least one of the remote luminaires 220 of the further luminaire nodes 101-103 of the network 100.

Depending on the received luminaire status information of the at least one remote luminaire 220, it is also possible to adjust the lighting state of the local luminaire to achieve synchronization of the lighting states across the network. In this regard, reference implementations are available and further details do not need to be explained in this regard.

To implement the synchronization between the various luminaire nodes 101-103 of the network 100 in a resource-efficient manner, the various controllers 200 of the luminaire nodes 101-103 are configured to employ a Trickle algorithm. The Trickle algorithm enables monitoring communication on the radio link 110 and selectively executing sending of packetized data indicating the luminaire status information of the local luminaire 220 depending on said monitoring. Hereinafter, various details with respect to the Trickle algorithm will be explained.

Figure 3:
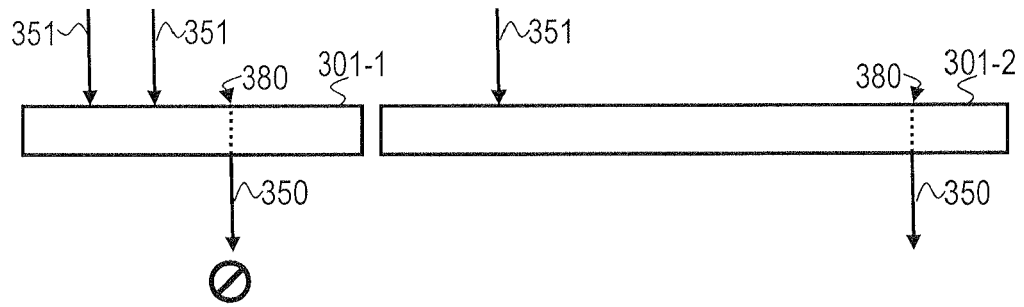
FIG. 3 is a signaling diagram illustrating aspects of selectively executing sending of packetized data on the communication link, the packetized data indicating luminaire status information of the luminaire being in-sync with luminaire status information of a remote luminaire.

Turning to FIG. 3, various aspects with regard to selectively executing sending of packetized data 350 indicating the luminaire status information in the framework of the Trickle algorithm is illustrated. In particular, the packetized data 350 is either sent or not sent at the predetermined point in time 380 that is obtained by random selection from within a predetermined time interval 301-1, 301-2.

In the scenario of FIG. 3, in the first time interval 301-1 (shown on the left side of FIG. 3), further packetized data 351 is received at two points in time; the further packetized data 351 indicates luminaire status information of remote luminaires 220 of further luminaire nodes 101-103 of the network 100.

For each further packetized data 351 that is received, the indicated luminaire status information of the respective remote luminaire 220 is compared with the luminaire status information of the local luminaire 220. A counter is implemented; the counter (not shown in FIG. 3) is adjusted depending on the comparison. At the beginning of a time interval 301-1, 301-2, the counter is reset, in the scenario of FIG. 3 to ZERO.

In the scenario of FIG. 3, the counter is incremented each time packetized data 351 is received which indicates luminaire status information of remote luminaire 220 that is in-sync with the luminaire status information of the local luminaire 220. In the scenario FIG. 3, both packetized data 351 received during the first time interval 301-1 indicates luminaire status information of the remote luminaire 220 that is in-sync with the luminaire status information of the local luminaire 220; this results in the counter being incremented twice to a value of TWO. E.g., a scenario would be conceivable where the further packetized data 351 indicates that the brightness of the respective remote luminaires 220 equals the brightness of the local luminaire 220, e.g., within a predefined range of tolerance or the like.

At the predetermined point in time 380, the counter is compared against a predefined threshold. In the scenario of FIG. 3, the predefined threshold equals ONE. Because the counter, having a value of TWO, is larger than the predefined threshold, sending of the packetized data 350 indicating the luminaire status information of the local luminaire 220 is not executed at the point in time 380 (as indicated in FIG. 3).

As can be seen from the above, said sending of the packetized data 350 is selectively executed if the luminaire status information of the local luminaire 220 is out-of-sync with the luminaire status information of the remote luminaires 220; in particular, whether or not the luminaire status information of the local luminaire 220 is out-of-sync with the luminaire status information of the remote luminaires 220 is determined depending on a threshold comparison between the counter and the predefined threshold Once the first time interval 301-1 has elapsed, a new, second time interval 301-2 (shown to the right side of FIG. 3) is determined and the counter is reset to ZERO. Again, the point in time 380 at which the packetized data 350 indicating the luminaire status information is selectively sent is determined by random selection from within the respective time interval 301 to decrease a likelihood of collisions in the shared resources.

In the scenario of FIG. 3, the determining of the time intervals 301-1, 301-2 depends on the monitoring of the communication on the radio link 110. In particular, the determining of the time interval 301, in the scenario of FIG. 3, depends on the threshold comparison between the counter of the previous time interval and the predetermined threshold. Because, as explained above, the threshold comparison yielded that at the point in time 380 of the first time interval 301-1 the counter exceeded the predefined threshold, the second time interval 301-2 is determined to be longer than the first time interval 301-1. By this, the frequency of occurrence of said sending of the packetized data 350 is reduced as a synchronization between the lighting states of the various luminaire nodes 101-103 has already been obtained. Thereby, a traffic load on the shared resources can be reduced and the likelihood of collisions in the shared resources can be further reduced.

In a second time interval 301-2, only once further packetized data 351 indicating luminaire status information of a remote luminaire 220 of one of the further luminaire nodes 101-103 of the network 100 is received. Also this further packetized data 351 indicates luminaire status information that is in-sync with the luminaire status information of the local luminaire 220; consequently, the counter is increased to ONE. At the point in time 380 randomly selected from within the second time interval 301-2, again the threshold comparison between the counter and the predefined threshold is executed. At the point in time 380 of the second time interval 301-2, both the counter and the predefined threshold equal ONE; because of this, sending of the packetized data 350 indicating the luminaire status information of the local luminaire 220 is executed.

Figure 4:
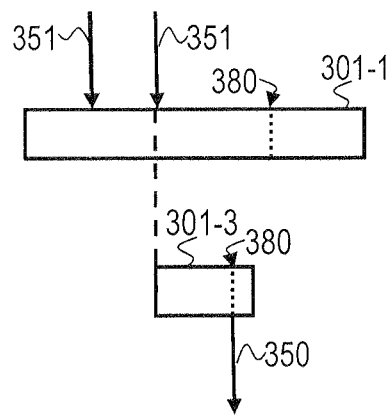
FIG. 4 is a signaling diagram illustrating aspects of selectively executing sending of packetized data on the communication link, the packetized data indicating luminaire status information of the luminaire being out-of-sync with luminaire status information of a remote luminaire.

In FIG. 4, aspects of said selectively executing of the sending of the packetized data 350 is illustrated in the scenario where further packetized data indicating luminaire status information of a remote luminaire 220 is received that is out-of-sync with the luminaire status information of the local luminaire 220.

In particular, the second further packetized data 351 received within the first time interval 301-1 is out-of-sync with the luminaire status information of the local luminaire 220. E.g., a scenario would be conceivable where the further packetized data 351 indicates that the brightness of the remote luminaire 220 is lower than the brightness of the local luminaire 220.

Then, in response to receiving the packetized data 351 indicating the luminaire status information of the remote luminaire 220 being out-of-sync with the luminaire status information of the local luminaire 220, the counter is reset and a new time interval 301-3 is determined. In particular, the new time interval 301-3 is shorter than the time interval 301-1; in various scenarios, it is conceivable that the time interval 301-3 which is determined in response to receiving the packetized data 351 indicating luminaire status information being out-of-sync with the luminaire status information of the local luminaire 203 is determined as a predefined minimum value Imin.

Again, the point in time 380 is determined by random selection from within the time interval 301-3. At the predetermined point in time 380, the counter, having a value of ZERO, is smaller than the predetermined threshold of ONE.

Thus, sending of the packetized data 350 indicating the luminaire status information of the local luminaire 220 is executed.

As can be seen, if missing synchronization between the lighting states of the various luminaires 220 of the luminaire nodes 101-103 of the network 100 is determined from monitoring the communication on the radio link 110, sending luminaire status information can be executed with a comparably low latency (compare time intervals 301-2 and 301-3). Thereby, achieving a synchronized state of the various luminaire nodes 101-103 of the network 100 within a short time can be facilitated.

The backoff times implemented by the random selection of the points in time 380 from the intervals 301-1-301-3 are sometime referred to as Trickle timers. The backoff times allow to avoid collisions on the shared resources.

Figure 5:
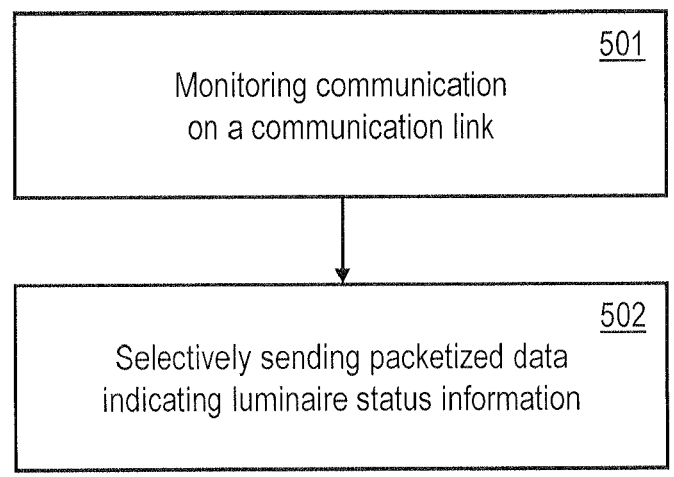
FIG. 5 is a flowchart of a method according to various embodiments.

Turning to FIG. 5, flowchart of a method according to various embodiments is illustrated. E.g., the processor 201 of the controller 200 could be configured to execute the method as illustrated in the flowchart of FIG. 5 upon executing control instructions stored in the memory of the controller 200.

First, communication on a communication link—e.g., the radio link 110—is monitored, 501. Monitoring can comprise listening for communication, receiving a respective packetized data, decoding the packetized data, and analyzing the content of the packetized data such as luminaire status information.

Next, packetized data is selectively sent, wherein the packetized data indicates luminaire status information of a local luminaire, 502. Preferably, up-to-date luminaire status information is sent which has been shortly received from the local luminaire, e.g., via a lighting control interface.

In particular, said selectively sending of the packetized data corresponds to selectively executing the sending of the packetized data depending on the monitoring of 501.

E.g., 501 and 502 could be executed according to the Trickle algorithm.

Figure 6:
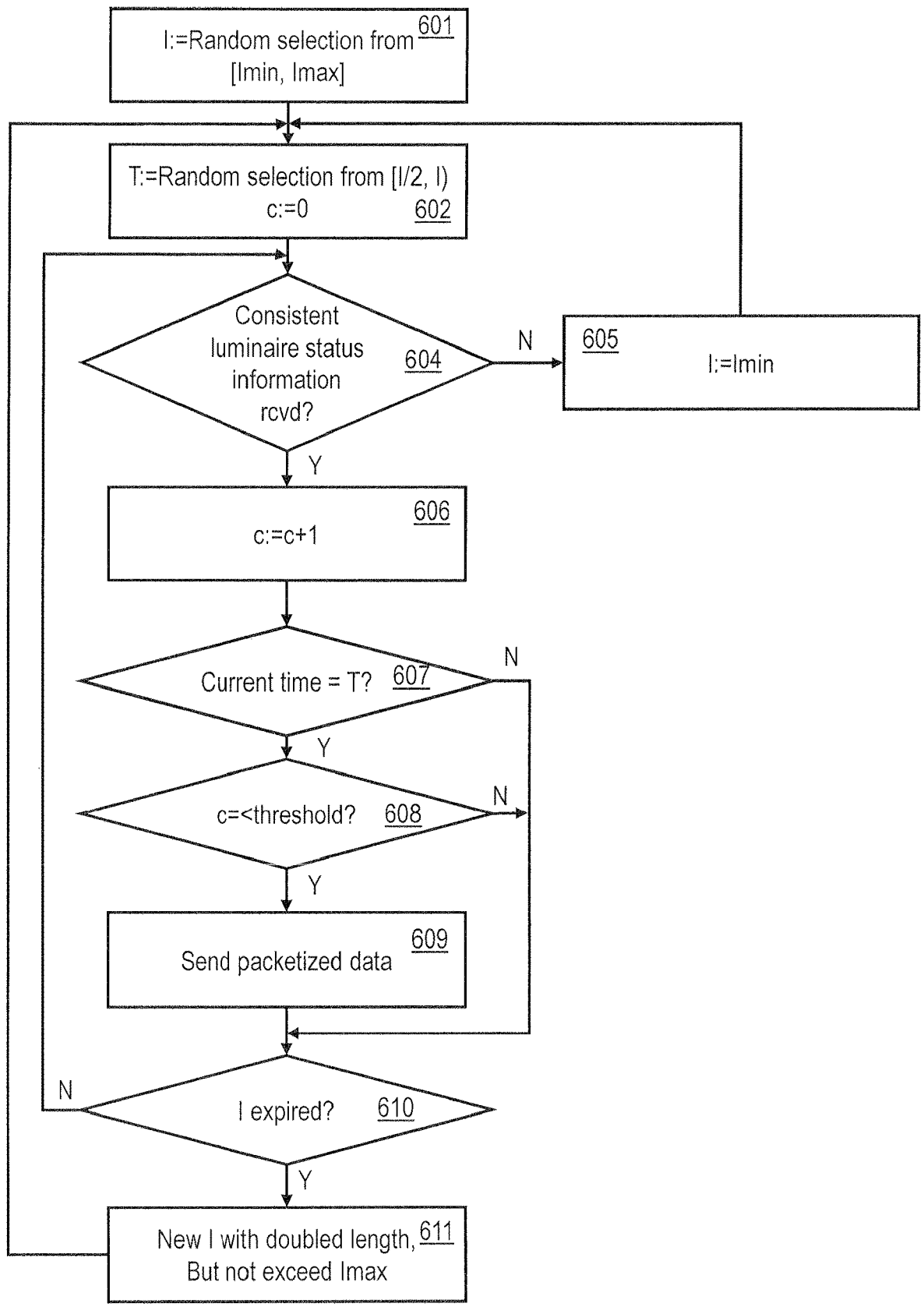
FIG. 6 is a flowchart of a method according to various embodiments, the method illustrating the Trickle algorithm in detail.

Turning to FIG. 6, various aspects with respect to the Trickle algorithm are explained in further detail.

The Trickle algorithm is based on the following principle: Every luminaire node 101-103 of the network 100 starts by sending luminaire status information, e.g., triggered by an external event. If the luminaire status information of a remote luminaire 220 and received by a luminaire node 101-103 is inconsistent with the lighting state of the luminaire 220 of the receiving luminaire node 101-103, then the receiving luminaire node 101-103 sends packetized data 350 indicating the luminaire status information of the local luminaire 220—said sending is executed based on its own Trickle timer.

If, however, the receiving luminaire node 101-103 receives packetized data 351 indicating consistent and in-sync luminaire status information, then its own Trickle time is restarted including an exponential backoff time until the own luminaire status information is potentially re-sent.

The exponential back off—coupled with selectively sending the packetized data including the luminaire status information of the local luminaire—ensures that the luminaire nodes 101-103 attain synchronization with comparably low latency, e.g., on the order of the few milliseconds. On the other hand, when the various luminaire nodes are in-sync and the respective luminaire status information is consistent, the traffic load on the communication link is comparably small such that only little bandwidth is used.

Also, when the number of luminaire nodes 101-103 in the network 100 increases, each luminaire node 101-103 can receive luminaire status information from more than a single source luminaire node 101-103. Therefore, if lighting states are synchronized across the network 100, a single luminaire node 101-103 receives luminaire status information from a plurality of luminaire nodes 101-103 and will therefore exponentially back of its own Trickle timer comparably more often. This ensures that every luminaire node 101-103 transmits less often if the number of luminaire nodes 101-103 and the network 100 increases. Therefore, the same collision avoidance mechanism may be used irrespective of the number of luminaire nodes 101-103 in the network 100. The number of packetized data 350, 351 sent in the shared resources of the communication link does not scale linearly with the number of luminaire nodes 101-103 in the network 100.

In FIG. 6, details of the Trickle algorithm are explained.

At 601, a time interval 301-1-301-3 (labelled I in FIG. 6) is determined for the first time period for that, the time interval 301-1-301-3 is determined by random selection from within the range [Imin, Imax] where Imin and Imax are predefined parameters.

Then, at 602, the point in time 380 (labelled T in FIG. 6) at which sending of the packetized data 350 is selectively executed, is determined by random selection from within the time interval is determined and 601. In detail, the point in time 380 is determined by random selection from within the range [I/2,I). Further, the counter (labelled c in FIG. 6) is reset to 0.

Then, communication on the radio link 110 is monitored; this comprises checking whether consistent luminaire status information of remote luminaires 220 of further luminaire nodes 101-103 of the network 100 has been received, 604. If inconsistent luminaire status information has been received, a new time interval is started having the minimum length Imin, 605 (cf. FIG. 4).

If, however, at 604 consistent luminaire status information is received, i.e., the luminaire status information of the respective remote luminaire 220 is in-sync with the luminaire status information of the local luminaire 220, the counter is increased by ONE, 606.

At 607, it is checked whether the point in time 380, where said sending of the packetized data 350 is selectively executed, has been reached. If this is not the case, at 610, it is checked whether the time interval has expired. If this is not the case, the monitoring of the communication on the radio link 110 is continued, 604.

If at 607 it is judged that the point in time 380 has been reached, it is checked whether the counter is below or equal the predefined threshold, 608. The threshold comparison is executed. If the counter is above the threshold, it is checked whether the time interval 301-1-301-3 has expired, 610.

If, however, the counter is below or equal the threshold at 608, next, the packetized data 350 indicating the luminaire status information of the local luminaire 220 is sent. As can be seen, 609 is selectively executed depending on the comparison between the luminaire status information of the local luminaire 220 and the luminaire status information of the remote luminaire 220 (604) the threshold comparison between the thus adjusted counter (608), i.e., depending on monitoring of the communication on the radio link 110.

If, at 610, it is determined that the interval 301-1-301-3 has expired, a new time interval 301-1, 301-3 is determined, e.g., again by random selection with a lower boundary that—if compared to 601—is adjusted, 611. Thereby, the backoff time is increased to reduce the traffic load.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

While above various techniques have been illustrated in the context of synchronizing luminaire status information, it should be understood that respective techniques may be to some extent also applied to synchronization of other kinds of status information, e.g., in the context of Connected Home or Internet of Things.

What is claimed is:

1. A controller, comprising:
   a transceiver configured to communicate on a communication link; and
   at least one processor configured to monitor, via the transceiver, communication on the communication link;

wherein the at least one processor is configured to send, at a predetermined point in time via the transceiver in shared resources of the communication link, packetized data indicating a luminaire status information of a luminaire;

wherein the at least one processor is configured to selectively execute said sending of the packetized data depending on said monitoring;

wherein the controller further comprises a lighting control interface and the at least one processor is configured to receive, via the lighting control interface from the luminaire, the luminaire status information, and the at least one processor is further configured to receive, via the transceiver as part of said monitoring of the communication on the communication link, further packetized data indicating luminaire status information of at least one remote luminaire;

and further wherein the at least one processor is configured to selectively execute said sending of the packetized data if the luminaire status information of the luminaire is out-of-sync with the luminaire status information of the at least one remote luminaire.

2. The controller of claim 1, wherein the luminaire status information is selected from the group comprising: brightness; color; dimmer; on/off-status; battery charge level.

3. The controller of claim 1, wherein the at least one processor is configured to determine if the luminaire status information of the luminaire is out-of-sync with the luminaire status information of the at least one remote luminaire depending on a threshold comparison between a counter and a predefined threshold; and further wherein the at least one processor is configured to adjust the counter depending on a comparison between the luminaire status information of the luminaire and each one of the luminaire status information of the at least one remote luminaire.

4. The controller of claim 1, wherein the at least one processor is configured to determine the point in time by random selection from within a predetermined time interval.

5. The controller of claim 4, wherein the at least one processor is configured to determine the time interval depending on said monitoring of the communication on the communication link.

6. The controller of claim 1, wherein the at least one processor is configured to execute a Trickle Algorithm to implement said monitoring of the communication on the communication link and said sending of the packetized data at the predetermined point in time.

7. A method of synchronizing lighting states of a plurality of luminaire nodes, the method comprising the steps of:

monitoring, by at least one processor, communication on a communication link; and sending, by the at least one processor, at a predetermined point in time on the communication link, packetized data indicating a luminaire status information of a luminaire, wherein said sending of the packetized data is selectively executed depending on said monitoring;

wherein said monitoring of the communication on the communication link comprises receiving further packetized data indicating luminaire status information of at least one remote luminaire; and wherein said sending of the packetized data is selectively executed if the luminaire status information of the luminaire is out-of-sync with the luminaire status information of the at least one remote luminaire.

8. The method of claim 7 further comprising the steps of:

selecting the luminaire status information from the group comprising: brightness; color; dimmer; on/off-status; battery charge level.

9. The method of claim 7 further comprising the step of:

receiving, from the luminaire, the luminaire status information.

10. The method of claim 7, further comprising the step of:

determining the point in time by random selection from within a predetermined time interval.

11. The method of claim 10, wherein said determining of the time interval depends on said monitoring of the communication on the communication link.

12. The method of claim 7, wherein said monitoring of the communication on the communication link and said sending of the packetized data at the predetermined point in time comprises executing a Trickle Algorithm.

* * * * *